July 8, 1941. P. B. TAYLOR 2,248,792
RIGHT-ANGLED GEAR DRIVE
Filed Sept. 2, 1939 2 Sheets-Sheet 2

INVENTOR
PHILIP B. TAYLOR
BY
ATTORNEY

Patented July 8, 1941

2,248,792

UNITED STATES PATENT OFFICE 2,248,792

RIGHT-ANGLED GEAR DRIVE

Philip B. Taylor, Upper Montclair, N. J., assignor to Wright Aeronautical Corporation, a corporation of New York Application September 2, 1939, Serial No. 293,219

17 Claims. (Cl. 74—410)

This invention relates to gear transmissions, being concerned particularly with a right-angled reduction gear drive suitable for use in aircraft.

Although the gear may be used in any other environment for which it is appropriate, it is particularly suitable for use in transmitting power from an aircraft engine disposed within a fuselage or wing to remote propellers, in installations where the power plant axis is transverse of the aircraft.

An object of the invention is to provide a right-angled gear drive for transmission of high torque in which a plurality of gear tooth contacts are utilized for the purpose of reducing the load intensity in any pinion pair.

Still another object is to provide a multiple pinion right-angled drive in which the load is divided up between plural sets of pinions, an associated object being to operate the pinion sets at rotational speeds in excess of either the driving shaft or driven shaft, whereby the torque transmitted by the individual pinion pairs is less than that which would obtain if the pinion pairs operated at low speed.

Still another object is to so proportion a plural pinion right-angled drive that the several sets of pinions will carry equal torsional loads by which tooth load intensity is substantially the same in all pinion pairs.

Still another object is to provide a unitary gear box incorporating the right-angled drive with step-up and step-down gearing at the driving and driven ends, respectively, of the gear set.

Further objects will be apparent after reading the annexed description in connection with the drawings, in which.

Figure 1:
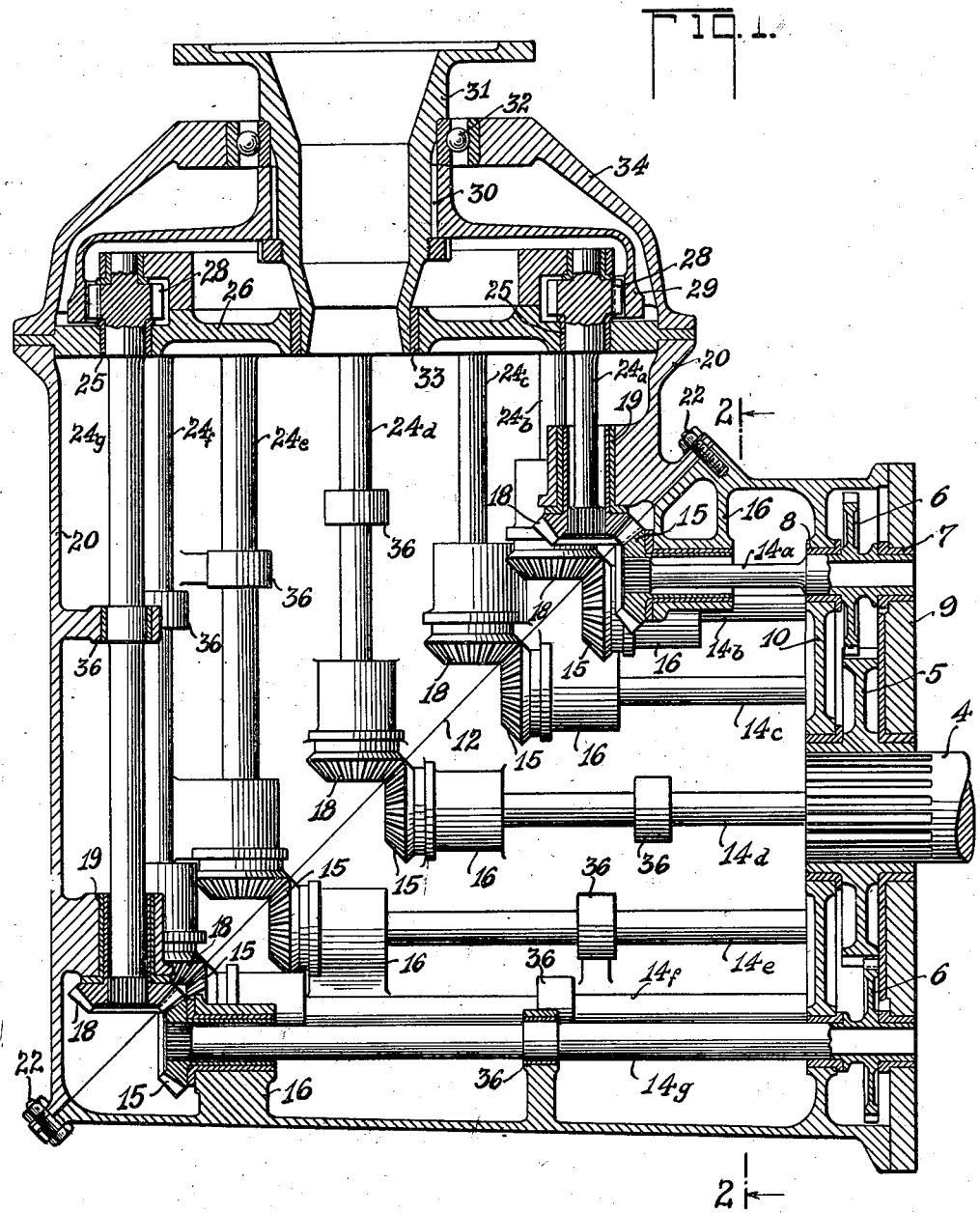
Fig. 1 is a plan in section of the gear set of the invention.
Figure 2:
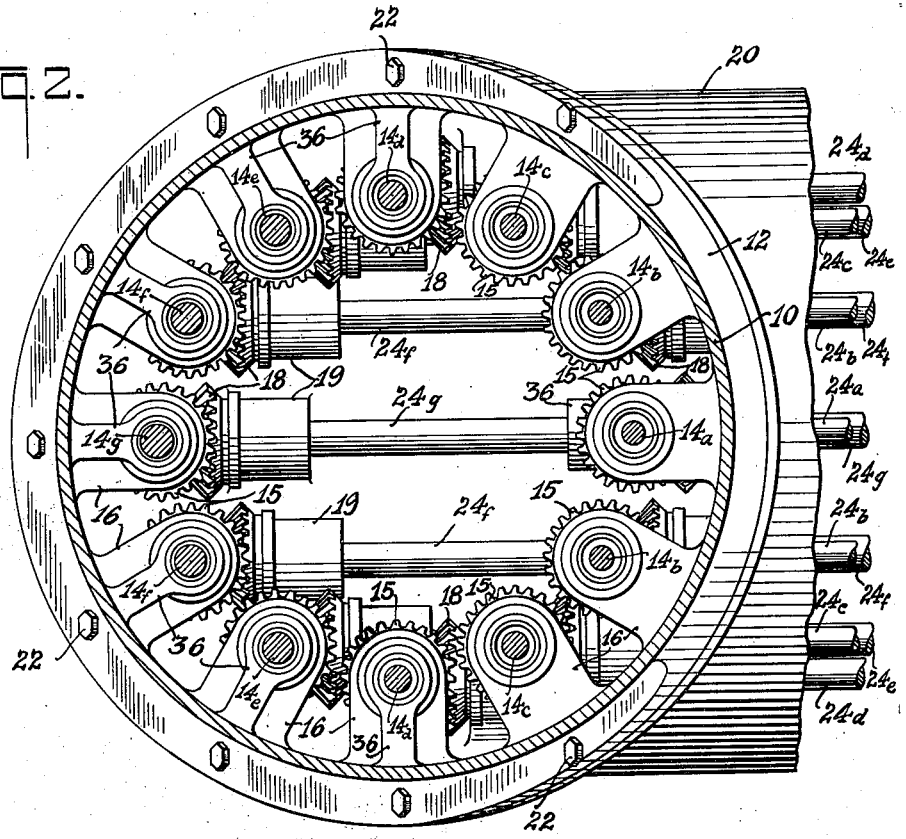
Fig. 2 is a section on the line 2—2 of Fig. 1.

An input power shaft is shown at 4, upon which is splined a drive gear 5 meshing with a plurality of small gears 6 circumferentially disposed around the gear 5 and borne in bearings 7 and 8 respectively carried by housings 9 and 10 secured to one another in concentric relationship. The housing 10 extends to the left, as shown, and is provided with a parting face 12 lying on a plane which makes an angle of 45° with the plane of the gear 5. Each pinion 6 is provided with an extension shaft 14 engaging a bevel gear 15, through a spline connection, journaled in bearing brackets 16 integral with the housing 10. The several shafts 14 are indicated as 14a to 14g inclusive, from top to bottom, as shown, and these shafts increase in length as the distance from the parting plane to the end of the housing 10 increases. The pinions 15 mesh with generally similar pinions 18 carried in bearings 19 integral with a second housing 20, whose axis is at right angles to the housing 10 and which is provided with a parting face at 45° to its axis, meeting with the angled face of the housing 10 and secured thereto as by bolts 22. Shafts 24a to 24g engage the several pinions 18 through spline connections and extend through bearings 25 in a housing member 26 secured to the end of the housing 20, the several shafts carrying pinions 28 which mesh with a bell gear 29 splined at 30 to an output shaft 31 borne at 32 and 33 in an extension housing 34 and in the housing 26, respectively.

The shafts 14 and 24 not only increase in length from positions a to g, but also increase in their polar moments of inertia when similar material is used in all, so that the torsional deflection or "wind-up" in all shafts will be the same to afford equal tooth loads on all the gears and pinions. In this connection, the shafts may be endowed with the same torsional stiffness if the polar moment of inertia $I_p$ be increased in direct proportion to the shaft length $l$; either solid or tubular shafts may be used. On the basis that all deflections are equal, the radius of the appropriate solid shafts for the system may easily be found from the following:

$$r_a = \sqrt[4]{l_a K}, \quad r_b = \sqrt[4]{l_b K}$$

etc.

wherein $r$ is the shaft radius.

$l$ is the effective shaft length.

and K equals $$\frac{2M}{\pi \odot E_s}$$

where $\odot$ is the allowable deflection in radians.

M is the torsional moment imposed on one shaft.

$E_s$ is the modulus of elasticity in shear.

The longer shafts 14d to 14g and 24d to 24g, inclusive, may be provided with steady bearings 36 midway of their length to eliminate any whipping tendencies therein at high speed. The splined connections between the shafts 14 and 24 and their respective pinions 15 and 18 may be identical in all bevel pinion pairs, whereby the pinions themselves are similar in every respect. Likewise, the pinions 6 may all be similar and may be secured to their shafts 14 through identical connections, and the pinions 28 may be similar and may be secured to the shafts 24 through identical connections.

In operation, driving power is imposed upon the transmission through the shaft 4, and with the step-up gearing from gears 5 to 6, all of the shafts 14 will rotate at approximately twice drive shaft speed according to the embodiment shown. The bevel pinions 15—18 are at 1:1 ratio, so that the shafts 24 will likewise rotate at double driveshaft speed. The ratio of the pinions 28 to the ring gear 29 is approximately 1 to 4, so that the driven shaft 31 will rotate at approximately one-half driveshaft speed. The gear ratios, of course, may be adjusted to any desired values, but it is extremely desirable to have the shafts 14 and 24 rotate at more than driveshaft speed to take advantage of the full reduction in torque in each shaft 14 and 18 which the invention makes possible. These shafts 14 and 18 accordingly may be made very small in diameter and light in weight, and in fact, the aggregate weight of the plural shafts and the pinions may be considerably less than the weight of the large shafts and pinions which would be necessary for a single set of bevel pinions for a right-angled drive of conventional character. It is also believed that the bulk of the entire assembly would be no greater than that necessary to house a large single set of bevel pinions designed to carry equivalent torque. Since the gear set is a completely housed unit, lubrication is readily provided by maintaining an appropriate level of gear lubricant in the casing and if necessary, a circulating pump system may be added to assure complete and proper lubrication of the uppermost gears and bearings.

Assembly and disassembly of the structure is readily accomplished by removal of the bolts 22 and parting the gear case on the parting plane 12, whereupon pinions 15 and 18 may be withdrawn from the shafts 14 and 24. Disassembly of the end gearing in each section is readily accomplished by removing the end housings.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim:

1. In a gear transmission including a power shaft and a driven shaft at right angles to one another, pluralities of small shafts each spaced around and parallel to respective shafts the shafts of each plurality being parallel to one another, bevel pinion sets affording a driving connection between pairs of right-angled small shafts, gearing drivably connecting the power shaft with the small shafts parallel thereto, and gearing drivably connecting the driven shaft with the small shafts parallel thereto.

2. In a gear transmission, a plurality of parallel circularly disposed shafts and a second plurality of parallel circularly disposed shafts intersecting the first plurality and disposed at an angle thereto, bevel gear driving connections between the respective shafts of the two pluralities, an input shaft geared to the several shafts of one plurality and an output shaft geared to the shafts of the other plurality.

3. In a gear transmission, a plurality of parallel circularly disposed shafts and a second plurality of parallel circularly disposed shafts intersecting the first plurality and disposed at an angle thereto, bevel gear driving connections between the respective shafts of the two pluralities, an input shaft geared to the several shafts of one plurality and an output shaft geared to the shafts of the other plurality, the several shafts of each plurality being of different lengths, and means to maintain equal power transmission through the several bevel gear driving connections and other gearing comprising the use of long shafts having high polar moment of inertia and short shafts having low polar moment of inertia to effect equal torsional stiffness in each upon imposition on each of the same torque load.

4. In a transmission, a pair of angularly disposed cylindrical housings having mating faces in a plane angled relative to the axes of both housings, bearings parallel to respective housing axes around said housings close to said parting plane, shafts in said bearings, and bevel gears at the shaft ends meshing with the corresponding bevel gears on the shaft ends of the other housing, said gear meshings being all coplanar with said mating plane.

5. In a transmission, a pair of angularly disposed cylindrical housings having mating faces in a plane angled relative to the axes of both housings, bearings parallel to respective housing axes around said housings close to said parting plane, shafts in said bearings, bevel gears at the shaft ends meshing with the corresponding bevel gears on the shaft ends of the other housing, said gear meshings being all coplanar with said mating plane, the ends of said housings opposite from the parting faces being in planes normal to respective housing axes, and gear trains thereat for driving the several shafts in unison.

6. In a transmission, a pair of angularly disposed cylindrical housings having mating faces in a plane angled relative to the axes of both housings, bearings parallel to respective housing axes around said housings close to said parting plane, shafts in said bearings, bevel gears at the shaft ends meshing with the corresponding bevel gears on the shaft ends of the other housing, said gear meshings being all coplanar with said mating plane, the ends of said housings opposite from the parting faces being in planes normal to respective housing axes, and gear trains thereat for driving the several shafts in unison, said shafts each having a polar moment of inertia proportional to its length whereby the torsional stiffness in all shafts will be substantially the same.

7. In a transmission, a pair of angularly disposed cylindrical housings having mating faces in a plane angled relative to the axes of both housings, bearings parallel to respective housing axes around said housings close to said parting plane, shafts in said bearings, bevel gears at the shaft ends meshing with the corresponding bevel gears on the shaft ends of the other housing, said gear meshings being all coplanar with said mating plane, the ends of said housings opposite from the parting faces being in planes normal to respective housing axes, gear trains thereat for driving the several shafts in unison, said shafts each having a polar moment of inertia proportional to its length whereby the torsional stiffness in all shafts will be substantially the same, and steady bearings intermediate the ends of the longer shafts.

8. In a gear connection between a drive shaft and a driven shaft, angled relative thereto, a plurality of smaller shafts parallel to each, the smaller shafts having driving connection with the main shafts to which they are parallel, and bevel gear connections between relatively angled pairs of small shafts, said smaller shafts being of different lengths and having polar moments of inertia respectively proportional to their lengths whereby each has substantially the same torsional stiffness.

9. In a reduction gear, a main drive shaft, a plurality of parallel small shafts spaced therearound, step-up gearing driving said small shafts in unison from the main shaft, parallel small shaft extensions bevel-geared to respective small shafts, a driven shaft, step-down gearing from the small shaft extensions to said driven shaft, and means to endow said small shafts and extensions with the same torsional stiffness wherefor they will each assume an equal share of the load transmitted.

10. In a gearset, a main shaft, at least two sub-shafts parallel thereto and driven thereby, one thereof being relatively long and of large polar moment of inertia relative to the other, and at least two sub-shaft extensions respectively bevel-geared to said sub-shafts, said extensions being of different length and of respectively different polar moment of inertia.

11. In a gearset, a main shaft, at least two sub-shafts parallel thereto and driven thereby, one thereof being relatively long and of large polar moment of inertia relative to the other, at least two parallel sub-shaft extensions respectively bevel-geared to said sub-shafts, said extensions being of different length and of respectively different polar moment of inertia and a second main shaft parallel to and driven by said sub-shaft extensions.

12. In a gearset, a main shaft, at least two sub-shafts parallel thereto and driven thereby, one thereof being relatively long and of large polar moment of inertia relative to the other, at least two parallel sub-shaft extensions respectively bevel-geared to said sub-shafts, and a second main shaft parallel to and driven by said sub-shaft extensions, said sub-shaft extensions, like the sub-shafts, being of different length and of correspondingly different polar moment of inertia.

13. In a transmission, a plurality of bevel gear sets so disposed that the engaged teeth of each set lie in a common plane angled relative to the axes of respective gears, a power shaft on each side of the common plane, and driving connections from the gears on each side of said plane to respective power shafts.

14. In a transmission, a plurality of bevel gear sets so disposed that the engaged teeth of each set lie in a common plane, the axes of the gears on the same side of the plane being parallel to one another, but the said axes on opposite sides of the plane being angled relative to the plane and to each other, and power shafts on each side of the plane parallel to the gear axes on the same side drivably connected with the bevel gears whose axes are parallel thereto.

15. In a transmission, a plurality of bevel gear sets so disposed that the engaged teeth of each set lie in a common plane, the axes of the gears on the same side of the plane being parallel to one another, but the said axes on opposite sides of the plane being angled relative to the plane and to each other, and power shafts on each side of the plane parallel to the gear axes on the same side drivably connected with the bevel gears whose axes are parallel thereto, the axes of the gears on each side of the plane being disposed on a circle.

16. In a transmission, angled power shafts each having a gear, a plurality of pinions spaced around and engaging each gear, the pinions for each gear comprising a set and having spaced-apart parallel shafts, and a bevel gear connection between each pinion shaft of one set and a corresponding pinion shaft of the other set.

17. In a transmission, angled power shafts each having a gear, a plurality of pinions spaced around and engaging each gear, the pinions for each gear comprising a set and having spaced-apart parallel shafts, and a bevel gear connection between each pinion shaft of one set and a corresponding pinion shaft of the other set, the bevel gear tooth engagements all lying in a common plane.

PHILIP B. TAYLOR.